(12) United States Patent
Mizumoto et al.

(10) Patent No.: US 10,273,360 B2
(45) Date of Patent: Apr. 30, 2019

(54) SLIDE FASTENER PROVIDED WITH MOLDED COMPONENT

(75) Inventors: Kazuya Mizumoto, Toyama (JP); Tatsurou Nara, Toyama (JP); Takuya Abe, Toyama (JP)

(73) Assignee: YKK Corporation (JP)

( * ) Notice: Subject to any disclaimer, the term of this patent is extended or adjusted under 35 U.S.C. 154(b) by 262 days.

(21) Appl. No.: 14/362,622

(22) PCT Filed: Dec. 27, 2011

(86) PCT No.: PCT/JP2011/080335
§ 371 (c)(1),
(2), (4) Date: Jun. 4, 2014

(87) PCT Pub. No.: WO2013/098978
PCT Pub. Date: Jul. 4, 2013

(65) Prior Publication Data
US 2015/0017458 A1 Jan. 15, 2015

(51) Int. Cl.
*A44B 19/26* (2006.01)
*C08K 7/02* (2006.01)
(Continued)

(52) U.S. Cl.
CPC .............. *C08L 77/06* (2013.01); *A44B 19/12* (2013.01); *B29D 5/02* (2013.01); *C08K 7/14* (2013.01);
(Continued)

(58) Field of Classification Search
CPC ... C08K 7/14; C08K 3/40; C08K 3/04; C08K 7/04; C08K 7/06; C08K 7/10;
(Continued)

(56) References Cited

U.S. PATENT DOCUMENTS 3,661,837 A * 5/1972 Cadus ................. B29C 47/1045
523/348
3,988,491 A * 10/1976 Dixon ..................... D06M 11/09
427/248.1

(Continued)

FOREIGN PATENT DOCUMENTS

DE 3444813 A1 * 6/1986 ............. A44B 19/26
EP 1942147 B1 4/2009
(Continued)

OTHER PUBLICATIONS

EPO machine translation of DE3444813A1 published Jun. 1986.*
(Continued)

*Primary Examiner* — Monique R Jackson
(74) *Attorney, Agent, or Firm* — Kilpatrick Townsend & Stockton LLP

(57) ABSTRACT

Provided is a molded component for slide fasteners, which has a good balance between mechanical strength and platability. This molded component for slide fasteners is made of a resin composition that contains 30-50% by mass of a polyamide and 50-70% by mass of reinforcing fibers, with the total of the polyamide and the reinforcing fibers being substantially 100% by mass. In the resin composition, the polyamide has a weight average molecular weight of 30,000-80,000, and 50% by mass or more of the polyamide is composed of an aliphatic polyamide.

5 Claims, 1 Drawing Sheet

(51) Int. Cl.
*C08L 77/06* (2006.01)
*C23C 28/02* (2006.01)
*A44B 19/12* (2006.01)
*B29D 5/02* (2006.01)
*C08K 7/14* (2006.01)
*B29K 77/00* (2006.01)

(52) U.S. Cl.
CPC ........ *C23C 28/021* (2013.01); *B29K 2077/00* (2013.01); *Y10T 428/31681* (2015.04)

(58) Field of Classification Search
CPC ..... C08K 7/02–14; C08L 77/00; C08L 77/06; C08L 77/02; C08L 77/04; C08L 77/08
See application file for complete search history.

(56) References Cited

U.S. PATENT DOCUMENTS

| | | | |
|---|---|---|---|
| 4,791,027 A * | 12/1988 | Reimann | C08J 3/203 428/407 |
| 5,744,433 A * | 4/1998 | Storstrom | B22F 1/0059 419/31 |
| 6,299,942 B1 * | 10/2001 | Tamura | C23C 18/1641 427/304 |
| 6,383,622 B1 * | 5/2002 | Ishibashi | A44B 19/26 24/381 |
| 2001/0004787 A1 | 6/2001 | Nagata et al. | |
| 2002/0051874 A1 | 5/2002 | Ishibashi et al. | |
| 2004/0049006 A1 | 3/2004 | Aramaki et al. | |
| 2006/0118988 A1 * | 6/2006 | Louw | B05D 3/0446 264/82 |
| 2006/0292385 A1 | 12/2006 | Renkn et al. | |
| 2008/0167415 A1 | 7/2008 | Stoeppelmann et al. | |
| 2010/0305257 A1 * | 12/2010 | Trouillet-Fonti | C08L 77/06 524/413 |
| 2011/0240930 A1 * | 10/2011 | Stoeppelmann | C08L 77/00 252/511 |
| 2011/0287272 A1 * | 11/2011 | Elia | C08J 5/043 428/458 |

FOREIGN PATENT DOCUMENTS

| | | |
|---|---|---|
| JP | 60-238360 A | 11/1985 |
| JP | 63103077 A | 5/1988 |
| JP | 2-134013 U | 11/1990 |
| JP | 8-253869 A | 10/1996 |
| JP | 9-239727 A | 9/1997 |
| JP | 2000-7924 A | 1/2000 |
| JP | 2001-178508 A | 7/2001 |
| JP | 2001-226579 A | 8/2001 |
| JP | 2004-26982 A | 1/2004 |
| JP | 2005-160667 A | 6/2005 |
| JP | 2008508399 A | 3/2008 |
| WO | 02/48239 A1 | 6/2002 |

OTHER PUBLICATIONS

Mann, The Influence of the Pretreatment on the Adhesion of Metallic Coatings on Plastics, 1992, In: Mittal (ed) Metallized Plastics 3, pp. 295-302.*
Hayes, Direct fluorination of polyamide, 1977, Journal of Fluorine Chemistry, vol. 10, Issue 1, Abstract.*
Burke, Nylon 66 Polymers. I. Molecular Weight and Compositional Distribution, 1969, Journal of Polymer Science: Part A-2, vol. 7, pp. 1-25.*
Kharitonov, Direct fluorination of polymers—From fundamental research to industrial applications, 2008, Progress in Organic Coatings, vol. 61, pp. 192-204.*
Wade, Plasma Surface Modification of Glass Fibre-Reinforced Nylon-6,6 Thermoplastic Composites for Improved Adhesive Bonding, 2000, Interface Science 8, pp. 363-373.*
International Preliminary Report on Patentability, PCT Application No. PCT/JP2011/080335, dated Jul. 10, 2014.
International Search Report, PCT Application No. PCT/JP2011/080335, dated Mar. 13, 2012.
Office Action, German Patent Application No. 11 2011 106 039.4, dated Apr. 30. 2018.
Domininghaus, Die Kunststoffe und ihre Eigenschaften. 5. völlig neu bearbeitete und erweiterte Auflage. Berlin, Heidelberg, New York: Springer Verlag, 1998, p. 678 f. ISBN: 3-540-62659-x.

* cited by examiner

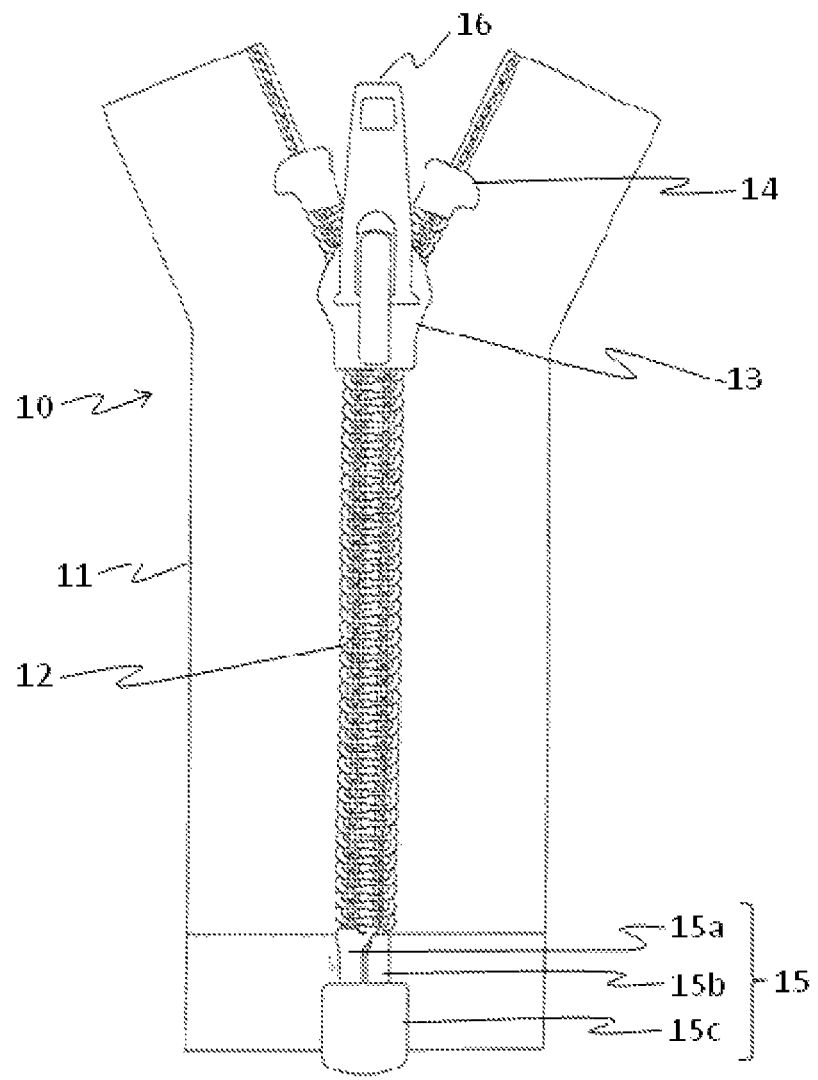

SLIDE FASTENER PROVIDED WITH MOLDED COMPONENT

This application is a national stage application of PCT/JP2011/080335, which is incorporated herein by reference.

TECHNICAL FIELD

The present invention relates to molded components for slide fasteners such as a slider, a top stop, and a bottom stop. The present invention also relates to a slide fastener provided with the molded components for slide fasteners.

BACKGROUND ART

A slide fastener is an opening and closing device of articles utilized not only in daily necessities such as clothing, bags, shoes, and sundry articles, but also in industrial articles such as water storage tanks, fishing nets, and space suits.

FIG. 1 shows the structure of a common slide fastener. A slide fastener 10 is mainly composed of three portions: a pair of long tapes 11, a large number of elements 12 which are the engagement portions of the fastener attached by sewing along a side edge of each tape, and a slider 13 which controls opening and closing of a fastener by engaging and separating the elements 12. Moreover, for preventing the slider 13 from dropping off, a top stop 14 and an opening device 15 can be provided, and a pull-tab 16 can be attached to the surface of the slider 13. The opening device 15 may comprise an insert pin 15a and a retaining box 15c with a box pin 15b. The slider 13 cancels the engagement of the elements 12 while moving to the opening device 15 provided at the bottom of the long tapes 11, pulls out the insert pin 15a from the retaining box 15c, and separates the tapes 11.

Among the components of a slide fastener, elements, a slider, a top stop and a bottom stop, and an opening device are molded components generally manufactured by injection molding, and it is known that these components can be produced from polyamides.

For example, DE No. 3444813 describes a method for forming a slider from a glass fiber-reinforced polyamide by injection molding for the purpose of improving the durability to washing and ironing of a slider to be used for a slide fastener for bedclothes and the wear resistance to sliding of the slider (claim 1). In DE No. 3444813, it is described that the length of glass fibers is 4 to 8 mm, and the content thereof is 25% by weight or more (claim 1); it is described that a slider is subjected to recrystallization treatment after molding (claim 1); it is described that polyamide 6,6 is used as a polyamide (claim 6); and it is also described that a polyamide containing neither a lubricant nor a gliding agent is used, and the content of glass fibers is about 40% by weight (claim 5).

On the other hand, a method of metal plating an article made of polyamides is known, and National Publication of International Patent Application No. 2008-508399 discloses "a method of preparing a metal plated polyamide composition, characterized in that it comprises applying metal plating to an article comprising a polyamide composition comprising: (a) about 40 to about 95 weight percent of at least one polyamide, (b) about 5 to about 50 weight percent of at least one mineral filler, and (c) about 0.1 to about 10 weight percent of at least one plasticizer, wherein the weight percentages are based on the total weight of the composition" (claim 1). This patent describes, as a method of metal plating, a process involving etching the surface of an article with an acid such as a chromic acid/sulfuric acid blend, followed by depositing a plating catalyst such as tin-stabilized colloidal palladium particles on the surface, subsequent removal of the tin stabilizer, applying an electroless deposition of a layer of metal such as nickel or copper, and applying an electrolytic deposition (galvanoplating) of metals such as copper, nickel, and/or chromium (paragraph 0019). It is also described in this patent that glass fibers may be used as a reinforcing agent (paragraph 0016).

Moreover, Japanese Patent Publication No. H6-76668 discloses "a method for plating plastic comprising: when a surface of a plastic substrate is subjected to electroless plating, bringing the substrate surface into contact with a gaseous mixture mainly containing gaseous fluorine and an inert gas beforehand to etch or activate the surface" for the purpose of increasing the adhesion of a metal-plated film to the plastic surface (claim 1).

CITATION LIST

Patent Literature

Patent Literature 1: DE No. 3444813
Patent Literature 2: National Publication of International Patent Application No. 2008-508399
Patent Literature 3: Japanese Patent Publication No. H6-76668

SUMMARY OF INVENTION

Technical Problem

When a molded component for slide fasteners, such as a slider, is produced from a polyamide resin, it may be required that the designability be increased by applying metal plating to the surface thereof because the molded component lacks designability as it is. On the other hand, the molded component for slide fasteners is also required to have a strength that can endure practical use. However, a conventional slider made of a polyamide resin aims primary at improving the durability against washing and ironing and the wear resistance to sliding of the slider, and an approach for the purpose of providing both mechanical strength and platability at the same time has not been investigated.

Thus, an object of the present invention is to provide a molded component for slide fasteners, which has a good balance between mechanical strength and platability. Moreover, another object of the present invention is to provide a slide fastener provided with such a molded component for slide fasteners.

Solution to Problem

As a result of intensive studies on the improvement in the molded component for slide fasteners made of a resin composition containing a polyamide and reinforcing fibers, the present inventors have obtained the following findings: (1) Affinity of polyamide with reinforcing fibers, such as glass fibers, differs depending on the type of polyamides. A polyamide having a ring structure, such as an aromatic polyamide and an alicyclic polyamide, lacks affinity with reinforcing fibers because it is rigid, while an aliphatic polyamide has high flexibility, resulting in high affinity with reinforcing fibers. Therefore, if a large amount of reinforcing fibers are mixed with a polyamide having a ring structure, strength will fall conversely, while an aliphatic polyamide will provide a high strength improvement effect even if a large amount of reinforcing fibers are added to the aliphatic polyamide. Moreover, when a high concentration of reinforcing fibers is contained in a polyamide including a large proportion of ring structures such as a benzene ring, it is liable to cause melt fracture during molding. Therefore, it has poor molding processability.

(2) Although the strength is improved by increasing the concentration of reinforcing fibers, the resulting decrease in the concentration of a polyamide component results in the decrease in the number of terminal carboxyl groups. Therefore, the platability is impaired.

(3) The increase in a molecular weight of polyamides contributes to the strength improvement, but the productivity may be impaired due to the increase in viscosity, or the platability may be reduced by the relative decrease in the number of terminal carboxyl groups. Although it is necessary to reduce the molecular weight for obtaining high platability, strength will be impaired this time.

(4) When an aromatic component is added, the heat resistance will be improved. However, the toughness is impaired, reducing the mechanical strength.

(5) When the concentration of reinforcing fibers is increased or the molecular weight of polyamides is increased, the melt flow rate (MFR) of a resin composition will be reduced. However, if MFR is excessively reduced, the filling factor during the injection molding of a molded component for slide fasteners such as a slider will be reduced due to the deterioration of flowability, causing a problem such as yield lowering and a prolonged molding cycle. When the concentration of reinforcing fibers is decreased or the molecular weight of polyamides is decreased, the melt flow rate (MFR) of a resin composition will increase. Also, extending a molecular weight distribution will increase lower molecular weight ingredients, leading to an increase in MFR and improvement of fluidity during the injection molding. However, when MFR excessively increases, not only the strength is decreased, but also problems arise such as a poor appearance caused by the generation of flow unevenness due to the increase in the low molecular weight ingredients and a dimensional stability reduction in a summer environment caused by the influence of water absorption by polymer ingredients.

Based on the above findings, the present inventors have found that both strength and platability can be compatible by using an aliphatic polyamide having a high affinity with reinforcing fibers at a high concentration and increasing the mixing proportion of the reinforcing fibers to improve strength while ensuring platability by suppressing the weight average molecular weight (Mw) of polyamides at a relatively low level. Further, the present inventors have found that a strength improvement effect due to the high affinity between an aliphatic polyamide and reinforcing fibers can be sufficiently exhibited if no ingredient other than polyamides and reinforcing fibers, desirably no ingredient other than an aliphatic polyamide and reinforcing fibers, is added. Furthermore, the present inventors have also found that excellent moldability, good appearance, and excellent dimensional stability can be obtained by controlling MFR in a certain range.

Accordingly, in one aspect, the present invention provides a molded component for slide fasteners made of a resin composition containing 30 to 50% by mass of a polyamide and 50 to 70% by mass of reinforcing fibers, with the total of the polyamide and the reinforcing fibers being substantially 100% by mass, wherein the polyamide has a weight average molecular weight of 30,000 to 80,000, and 50% by mass or more of the polyamide is composed of an aliphatic polyamide.

In one embodiment of the molded component for slide fasteners according to the present invention, the resin composition has a melt flow rate of 6 to 50 g/10 min.

In another embodiment of the molded component for slide fasteners according to the present invention, the carboxyl group equivalent on a surface of the component is 0.9 atom % or more.

In a further embodiment of the molded component for slide fasteners according to the present invention, the proportion of the aliphatic polyamide is 80 parts by mass or more based on 100 parts by mass of the total amount of the polyamide.

In a further embodiment of the molded component for slide fasteners according to the present invention, the proportion of the aliphatic polyamide is 100 parts by mass based on 100 parts by mass of the total amount of the polyamide.

In a further embodiment of the molded component for slide fasteners according to the present invention, the aliphatic polyamide includes at least one aliphatic polyamide obtained by the co-polycondensation of an aliphatic diamine and an aliphatic dicarboxylic acid.

In a further embodiment of the molded component for slide fasteners according to the present invention, the aliphatic polyamide includes at least one selected from the group consisting of nylon 6,6, nylon 6,10, and nylon 6,12.

In a further embodiment of the molded component for slide fasteners according to the present invention, the reinforcing fibers include at least one selected from the group consisting of glass fibers, carbon fibers, and aramid fibers.

In a further embodiment of the molded component for slide fasteners according to the present invention, at least a part of its surface is metal plated.

In another aspect, the present invention is a slide fastener provided with the molded component for slide fasteners according to the present invention.

Advantageous Effects of Invention

The present invention provides a molded component for slide fasteners, which has a good balance between mechanical strength and platability. High designability can also be achieved by plating the molded component for slide fasteners according to the present invention. Further, by excluding a needless component, a strength improvement effect due to the high affinity between an aliphatic polyamide and reinforcing fibers can be sufficiently exhibited, and a low cost can be achieved as well. Furthermore, a molded component for slide fasteners having high quality stability can be produced with high production efficiency from a resin composition having a controlled MFR.

BRIEF DESCRIPTION OF DRAWINGS

FIG. 1 is a front view showing an example of a structure of a slide fastener.

DESCRIPTION OF EMBODIMENTS

One of the features of the present invention is to form a molded component for slide fasteners from a resin composition in which only a polyamide and reinforcing fibers are blended in a predetermined proportion, in order to achieve the mechanical strength and platability which are required for the molded component for slide fasteners. Various additives, such as a filler, a heat-resistant stabilizer, a weather-resistant agent, a hydrolysis-resistant agent, and a pigment, are added to a common resin molded component for slide fasteners, but such additives are not used in the present invention. Rather, such additives may be impediments to the strength improvement effect achieved by the high affinity between an aliphatic polyamide and reinforcing fibers. Adding various additives also leads to cost increase. Accordingly, from one point of view, it can be said that the present invention has a large technical contribution in terms of having found that a resin molded component for slide fasteners having high practicality can be provided with the minimum ingredients.

Specifically, the molded component for slide fasteners according to the present invention is made of a resin composition containing 30 to 50% by mass of a polyamide and 50 to 70% by mass of reinforcing fibers, with the total of the polyamide and the reinforcing fibers being substantially 100% by mass, wherein the polyamide has a weight average molecular weight of 30,000 to 80,000, and 50% by mass or more of the polyamide is an aliphatic polyamide. The "substantially" is an expression assuming that unexpected impurities are mixed into the composition in the production process, and is not an expression assuming that other components are positively added. The total of the aliphatic polyamide and the reinforcing fibers in a resin composition is generally 99% by mass or more, preferably 99.5% by mass or more, more preferably 99.9% by mass or more, and most preferably 100% by mass.

In the present invention, 50% by mass or more of the polyamide is an aliphatic polyamide because the aliphatic polyamide has high affinity with reinforcing fibers as described above and reinforcing fibers can be filled in a high proportion. Moreover, an aliphatic polyamide has more amide bonds in a unit molecular structure than an aromatic polyamide. Therefore, an aliphatic polyamide has a high effect of increasing carboxyl groups by surface modification to be described below, and the platability is easily improved. The content of an aliphatic polyamide in the polyamide is preferably 80% by mass or more, more preferably 100% by mass.

The aliphatic polyamide is obtained by, but not limited to, co-polycondensation of an aliphatic diamine and an aliphatic dicarboxylic acid, polycondensation of W-amino acid, and ring opening polymerization of lactams. Examples of the aliphatic diamine include linear or branched aliphatic diamines such as ethylenediamine, propylenediamine, butylenediamine, hexamethylenediamine, 2-methylpropanediamine, 3-methylpropanediamine, octamethylenediamine, decanediamine, and dodecanediamine. Examples of the aliphatic dicarboxylic acid include linear or branched aliphatic dicarboxylic acids such as succinic acid, propanedioic acid, butanedioic acid, pentanedioic acid, adipic acid, heptanedioic acid, octanedioic acid, nonanedioic acid, decanedioic acid, dodecanedioic acid, undecanedioic acid, dimer acid, and hydrogenated dimer acid. Examples of the ω-amino acid include 6-aminohexanoic acid, 11-aminoundecanoic acid, and 12-aminododecanoic acid. Examples of the lactam include ε-caprolactam, undecanelactam, and lauryllactam.

A typical specific structure of an aliphatic polyamide includes, but is not limited to, a polyamide having a repeating monomer unit represented by the following formula: —NHR$_1$NHC(=O)R$_2$C(=O)— or —NHR$_1$C(=O)— wherein R$_1$ and R$_2$ may be the same or different groups and each represent an alkylene group having at least 2 carbon atoms, preferably 2 to 12 carbon atoms, and more preferably 6 to 10 carbon atoms, or a combination of these repeating monomer units. Specific examples of the aliphatic polyamide include aliphatic polyamides synthesized by co-polycondensation reaction of an aliphatic diamine and an aliphatic dicarboxylic acid, such as polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanediamide (nylon 6,12), polyheptamethylene pimelamide (nylon 7,7), polyoctamethylene suberamide (nylon 8,8), polynonamethylene azelamide (nylon 9,9), and polydecamethylene azelamide (nylon 10,9), and in addition include aliphatic polyamides synthesized by polycondensation reaction of ω-amino acid and ring opening polymerization of lactam, such as poly(4-aminobutanoic acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), and poly(12-aminododecanoic acid) (nylon 12). These may be used singly or in combination of two or more.

Moreover, copolymers obtained by arbitrary combinations of repeating units of aliphatic polyamides can also be used. Examples of these aliphatic polyamide copolymers include, but are not limited to, a caprolactam/hexamethylene adipamide copolymer (nylon 6/6,6), a hexamethylene adipamide/caprolactam copolymer (nylon 6,6/6), and a hexamethylene adipamide/hexamethylene azelamide copolymer (nylon 6,6/6,9).

In the present invention, it is preferred for obtaining high platability that at least one aliphatic polyamide obtained by co-polycondensation of an aliphatic diamine and an aliphatic dicarboxylic acid be included, and it is more preferred to use only such an aliphatic polyamide as the aliphatic polyamide. This is because the higher the carboxyl group concentration is, the better the platability, and the carboxyl group concentration can be increased by using a dicarboxylic acid. Moreover, the use of a monomer having a low molecular weight increases the relative amount of amide bonds and thereby improves platability, but it undesirably increases hydrogen-bonding sites and thereby increases water absorption properties. This poses a problem of increasing the humidity dependence of strength. Therefore, in the above-described polyamide having a repeating monomer unit represented by the formula: —NHR$_1$NHC(=O)R$_2$C(=O)—, preferred is an aliphatic polyamide in which R$_1$ and R$_2$ each independently represent an alkylene group having 6 to 12 carbon atoms. For example, it is preferred to use at least one selected from the group consisting of nylon 6,6, nylon 6,10 and nylon 6,12.

Although it is not necessary to positively add any polyamide other than an aliphatic polyamide to a resin composition, the polyamide other than an aliphatic polyamide can be added if its content in all the polyamides is less than 50% by mass. Examples of the polyamide other than an aliphatic polyamide include, but are not particularly limited to, an aromatic polyamide and a non-aromatic cyclic polyamide. These are obtained by using, as a monomer component, at least one of diamine, dicarboxylic acid, and W-amino acid having an aromatic group or a non-aromatic cyclic group, and subjecting the monomer component to polycondensation. The polyamide other than an aliphatic polyamide may be used singly or in combination of two or more.

Examples of the diamine include aromatic diamines, such as 1,2-diaminobenzene, 1,3-diaminobenzene, 1,4-diaminobenzene, and meta-xylenediamine; and diamines having a non-aromatic cyclic group, such as isophoronediamine, 2-aminomethyl piperidine, 4-aminomethyl piperidine, 4,4'-diamino dicyclohexylene methane, 4,4'-diamino-3,3'-dimethyl dicyclohexylene methane, 1,3-di(4-piperidyl)-propane, 1,2-diaminocyclohexane, 1,3-diaminocyclohexane, 1,4-diaminocyclohexane, N-aminopropyl piperazine, 4,4'-diamino dicyclohexylene propane, 1,2-bis(aminomethyl)cyclohexane, and 1,4-bis(aminopropyl)piperazine.

Examples of the dicarboxylic acid include aromatic dicarboxylic acids, such as phthalic acid, terephthalic acid, and isophthalic acid; and dicarboxylic acids having a non-aromatic cyclic group, such as 1,4-cyclohexanedicarboxylic acid, 1,2-cyclohexanedicarboxylic acid, 1,3-cyclohexanedicarboxylic acid, tetrahydrophthalic acid, tetrahydrophthalic anhydride, hexahydrophthalic acid, hexahydrophthalic anhydride, 3-methyl-1,2,3,6-tetrahydrophthalic anhydride, 4-methyl-1,2,3,6-tetrahydrophthalic anhydride, 3-methyl-1, 2,3,6-tetrahydrophthalic acid, 4-methyl-1,2,3,6-tetrahydrophthalic acid, 3-methylhexahydrophthalic anhydride, 4-methylhexahydrophthalic anhydride, 3-methylhexahydrophthalic acid, and 4-methylhexahydrophthalic acid.

Examples of the ω-amino acid include 4-piperidinecarboxylic acid, 3-piperidinecarboxylic acid, and 2-piperidinecarboxylic acid.

Specific examples of the polyamide other than the aliphatic polyamide include PA6T (co-polycondensate of hexamethylenediamine and terephthalic acid), PA6I (co-polycondensate of hexamethylenediamine and isophthalic acid), and PA-MXD (co-polycondensate of meta-xylylene diamine and adipic acid).

The weight average molecular weight of a polyamide used in the present invention is 30,000 to 80,000 because terminal carboxyl groups are increased by suppressing the molecular weight to a relatively low level to thereby improve platability. A preferred weight average molecular weight of a polyamide is 35,000 to 65,000. Note that, when only one polyamide is used, the weight average molecular weight of a polyamide as described herein refers to the weight average molecular weight of this polyamide, and when two or more polyamides are used, the weight average molecular weight of a polyamide as described herein refers to the weight average molecular weight of a mixture of these polyamides. In the present invention, the weight average molecular weight is measured by a gel permeation chromatograph (GPC).

Mechanical strength is generally adversely affected if the molecular weight is reduced, but in the present invention, reduction in mechanical strength is compensated by increasing the concentration of reinforcing fibers. Specifically, the resin composition from which the component for slide fasteners according to the present invention is formed contains 50 to 70% by mass of reinforcing fibers, which means that half or more of the weight of the resin composition is reinforcing fibers, and the remaining 30 to 50% by mass is a polyamide. As described above, since an aliphatic polyamide having high affinity with reinforcing fibers is used at a high proportion in the present invention, the strength improvement effect can be maintained even if reinforcing fibers are incorporated into the composition at such a high concentration. The upper limit of the content of reinforcing fibers is 70% by mass because platability is liable to be insufficient when the content of reinforcing fibers exceeds 70% by mass, and the lower limit of the content of reinforcing fibers is 50% by mass because sufficient mechanical strength is not easily developed when the content of reinforcing fibers is less than 50% by mass. From the viewpoint of a good balance among mechanical strength, platability, and also cost, the content of reinforcing fibers in a resin composition is 60 to 70% by mass, with the balance being a polyamide, and when the total amount of the polyamide is 100 parts by mass, it is preferred that 80 to 100 parts by mass be an aliphatic polyamide.

Examples of the reinforcing fibers used in the present invention include, but are not limited to, organic fibers, such as carbon fibers and aramid fibers; and inorganic fibers, such as glass fibers, needle-shaped wollastonite, and whiskers (examples: calcium titanate whisker, calcium carbonate whisker, and aluminum borate whisker). From the viewpoint of cost and rigidity, and in addition, from the viewpoint that the affinity with polyamide can be improved by reinforcing a fiber surface by silane coupling, it is preferred to use glass fibers. These may be used singly or in combination of two or more. The average fiber diameter before reinforcing fibers are compounded into a resin is preferably about 3 to 20 μm, more preferably about 5 to 10 μm. The average fiber length before reinforcing fibers are compounded into a resin is preferably about 1 mm to 10 mm, more preferably about 3 mm to 6 mm. Here, the fiber diameter refers to a diameter obtained by determining the cross-sectional area of reinforcing fibers and calculating the diameter assuming that the cross-sectional area is of a perfect circle. Moreover, the aspect ratio=average fiber diameter:average fiber length before reinforcing fibers are compounded into a resin is preferably 1:50 to 3:10000, more preferably 1:300 to 1:1200. After reinforcing fibers are compounded into a resin and molded, the average fiber length of reinforcing fibers is commonly reduced to 1/10 to 1/20 the original value, which is, for example, 0.1 to 1 mm, typically 0.1 to 0.5 mm.

Moreover, it is preferred to control the melt flow rate (MFR) of the resin composition from which the molded component for slide fasteners according to the present invention is formed. As described above, if MFR is excessively reduced, the filling factor during the injection molding of a molded component for slide fasteners such as a slider will be reduced due to the reduction in flowability, causing a problem such as yield lowering and a prolonged molding cycle. On the other hand, if MFR is excessively increased, not only the strength is reduced, but also problems arise such as poor appearance caused by the generation of flow unevenness due to the broadening of molecular weight distribution as well as reduction in dimensional stability in summer environment caused by the influence of water absorption by a polymer ingredient. MFR is preferably 6 to 50 g/10 min, more preferably 10 to 30 g/10 min. In the present invention, MFR is measured at 320° C. and a measuring load of 2.16 kg according to JIS K7210 (A method). A molded component for slide fasteners excellent in moldability and quality stability can be produced with high production efficiency by using a resin composition having an MFR in the above range.

The molded component for slide fasteners is not particularly limited as long as it is a molded component which constitutes a slide fastener, and examples thereof generally include an element, a slider, a pull-tab, a top stop and a bottom stop, and an opening device. At least one of the molded components for slide fasteners can be produced using the resin composition according to the present invention. Particularly, the resin composition according to the present invention can be suitably used as a material for a slider and a pull-tab. Further, various slide fasteners provided with the molded component for slide fasteners can be produced. Examples of the type of the element 12 which is the engagement portion of a slide fastener include, but are not particularly limited to, a coil fastener, an extruded fastener, and an injection-molded fastener.

An example of a method for producing a molded component for slide fasteners using a resin composition according to the present invention will be described. First, a polyamide and reinforcing fibers which are the components of the resin composition are sufficiently kneaded so that there may be no unevenness of components. A single screw extruder, a twin screw extruder, a kneader, or the like can be used for kneading. The kneaded resin composition is injection-molded using a mold having a predetermined shape to complete various molded components for slide fasteners. Though the conditions for injection molding are not particularly limited, a twin screw extruder can be suitably used. Then, when glass fibers are mixed in a high concentration, it is desirable in terms of productivity to mix the glass fibers with a resin in a molten state using a side feeder. As the conditions for injection molding, the cylinder temperature is preferably set to a temperature in the range of 280 to 320° C., and the mold temperature is preferably set to a temperature higher than conventional, for example, 90 to 130° C., from the viewpoint of ensuring high productivity without degradation.

In the molded component for slide fasteners according to the present invention, carboxyl group equivalent on the surface is preferably 0.9 atom % or more, more preferably 1.5 atom % or more, and it may be typically 1 to 4 atom %, more typically 1 to 2 atom %. This is because when the carboxyl group equivalent on a component surface is 0.9 atom % or more, good platability will be obtained and the plating will not be easily peeled off. The carboxyl group equivalent on a component surface depends on the type and concentration of a polyamide to be used. In order to increase the carboxyl group equivalent, a polyamide having a low molecular weight is used or a dicarboxylic acid is used as a monomer for polyamides.

Moreover, the carboxyl group equivalent can also be increased by modifying the surface after molding. The method of surface modification includes a method of forming a carboxyl group by hydrolyzing a surface amide bond. Examples of such a method include surface treatment utilizing fluorine gas as described in Japanese Patent Publication No. 6-76668, a method involving irradiation with UV, and a method involving irradiation with plasma. Although water for hydrolysis may be positively supplied, the amount of water contained as moisture in the air is enough. However, it should be paid attention to the fact that even if the surface is subjected to surface modification, sufficient carboxyl groups will not be formed when the type or concentration of a polyamide to be used is not appropriately selected.

Various kinds of metal plating can be applied to the molded component for slide fasteners according to the present invention. Examples of the metal plating include, but are not limited to, chrome plating, nickel plating, copper plating, gold plating, brass plating, and other alloy plating. The method of metal plating is not particularly limited, and electroplating (it is preferred to perform electroless plating before electroplating) as well as dry plating such as vacuum deposition, sputtering, and ion plating may be suitably performed. These methods may be combined. Among them, it is preferred to employ electroplating which can firmly coat even the inner part of a slider having a complicated shape, and it is more preferred to perform electroplating after preliminary electroless plating.

EXAMPLES

Hereinafter, examples of the present invention will be shown. However, these examples are provided in order to better understand the present invention and its advantage, and the present invention is not intended to be limited to these examples.

PA6T (co-polycondensate of hexamethylenediamine and terephthalic acid), PA6I (co-polycondensate of hexamethylenediamine and isophthalic acid), and PA66 (polyhexamethylene adipamide) were used as polyamides. Glass fibers (average fiber diameter: 11 μm, average fiber length before molding: 3 mm, average fiber length after molding: 0.25 mm) were used as reinforcing fibers.

The weight average molecular weight (Mw) of each polyamide was determined by a gel permeation chromatograph (GPC) under the following conditions. In examples in which a plurality of polyamides were mixed and used, a sample was obtained by melt-mixing polyamides using a twin screw extruder and extruding the mixture into a strand shape. Then, the resulting sample was cooled and cut to obtain pellets, for which molecular weight was determined.
Eluent: hexafluoroisopropanol+additive $CF_3COONa$ (5 mmol/L)
Standard reference material: standard polymethylmethacrylate, dimethyl terephthalate
Injection volume: 100 μL
Flow rate: 1.0 mL/min
Column temperature: 40° C.
Humidity: 0.2 w/v %
Pretreatment: filtered through a membrane filter (pore size: 0.2 μm).

Moreover, the melt flow rate (MFR) at 320° C. of each polyamide was determined according to JIS K7210 (A method). In examples in which a plurality of polyamides were mixed and used, MFR was measured using pellets obtained in the same manner as in the measurement of molecular weight.

The above polyamide and glass fibers were kneaded using a twin screw extruder so as to obtain each blending proportion (mass basis) described in Table 1. Then, the resulting molten resin was extruded into a strand shape and solidified in a cooling water tank. Then, the strand was cut with a pelletizer to prepare pellets of the resin compositions in Examples 1 to 7 serving as the objects for experiment. These were injection-molded to form a slider for slide fasteners of M-class (chain width being 5.5 mm or more and less than 7.0 mm) defined by JIS S3015. A cover and a pull-tab of the slider were also injection-molded from the same material. The cover refers to a component for fixing a pull-tab to a slider.

Each slider obtained was measured for the slider tab pull off strength and the top stop holding strength. Measurement was performed according to JIS-S-3015, respectively. The top stop holding strength was measured in both a normal-temperature environment (23° C., relative humidity: 50%) and a high-temperature environment (40° C., relative humidity: 80%).

With respect to the measurement of the slider tab pull off strength, when a load is applied to the pull-tab 16 and the bottom face of the slider body in a single slider 13 which has been molded from a resin and completed, the resistance of the slider 13 is measured. The strength test is performed to determine whether the slider 13 is broken or deformed by applying a load by pulling the pull-tab 16 of the slider 13 from the slider top face and further applying a load to the bottom face of the slider body.

Moreover, with respect to the measurement of the top stop holding strength, the lower part (in the direction in which the opening device 15 is provided) of the tape 11 of the fastener 10 in which the elements 12 are engaged is fixed, and the slider 13 is pulled up to the top stop 14. Then, the slider 13 is firmly pulled to measure the top stop holding strength to the tape 10. The breakage and deformation of the slider 13 were examined when the slider 13 was brought into contact with the top stop 14.

Moreover, each slider was subjected to fluorine gas treatment to measure the carboxyl group equivalent on the surface of the slider before and after the treatment. The fluorine gas treatment was performed by allowing the slider to stand still for 10 minutes in a treatment tank at a fluorine gas concentration of 2% by volume and a temperature of 25° C. The carboxyl group equivalent was measured as follow. The slider was impregnated with an aqueous silver nitrate solution for 30 minutes as a pretreatment and then taken out. Then, the unreacted aqueous solution was washed away with acetone, and the resulting slider was dried at room temperature for 24 hours. Through these procedures, the hydrogen atoms at the terminal of carboxyl groups were replaced by Ag (—COOH→—COOAg). The slider after the pretreatment was measured for the concentration of Ag using an X-ray photoelectron spectroscopic apparatus. The carboxyl groups on the surface were determined from the concentration of Ag.

Moreover, each slider was subjected to electroless copper-nickel plating to form a plating layer having a thickness of 0.5 μm, which was then subjected to copper pyrophosphate electroplating to form a plating layer having a thickness of 70 μm, which was further subjected to copper-tin-zinc electroplating to form a plating layer having a thickness of 1 μm. Thereafter, each slider was evaluated for the wash and dry durability.

The evaluation by washing was performed by attaching a slider to a fastener chain to form a slide fastener and washing and drying the slide fastener based on AATCC standards. For the washing and drying, a cycle of washing→rinsing→dewatering→drying was repeated for 5 cycles.

The evaluation of drying durability was performed by the following procedures. Tetrachloroethylene was put in the container of a washing fastness tester and heated to 60° C., and then a slider was put therein. The container was sealed and rotated for 60 minutes at 60° C. After the lapse of 60 minutes, the slider was taken out.

In all the evaluation tests, the test sample was determined to be "NG" when peeling was observed by visual observation at two places or more, and determined to be "OK" when peeling was observed at one place or less.

The results are shown in Table 1. Examples 1 to 3 and 6 are inventive examples, and Examples 4 to 5 and 7 are comparative examples.

In Examples 1 to 3 and 6, all of the weight average molecular weight of a polyamide, the blending amount of an aliphatic polyamide in the polyamide, and the concentration of glass fibers were appropriate. As a result, the sliders had a high mechanical strength, that is, a slider tab pull off strength of 140 N or more, a top stop holding strength (normal temperature) of 100 N or more, and a top stop holding strength (high temperature) of 70 N or more, and the increasing effect of the carboxyl group equivalent by fluorine gas treatment was also high. Moreover, the wash and dry durability was also high.

The slider tab pull off strength was higher in Example 3 than in Example 1 because, although the glass fiber concentration was lower in Example 3 than in Example 1, the blending proportion of the aliphatic polyamide (PA66) was higher in Example 3 than in Example 1. Moreover, since only the aliphatic polyamide (PA66) was used as a polyamide in Example 2, the slider tab pull off strength was the highest, and the increasing effect of the carboxyl group equivalent by fluorine gas treatment was also the highest.

On the other hand, in Example 4, since the aliphatic polyamide (PA66) was not used and the weight average molecular weight was too low, the mechanical strength and the increasing effect of the carboxyl group equivalent by fluorine gas treatment were insufficient. In Example 5, since the aliphatic polyamide (PA66) was used but its blending proportion was low, sufficient mechanical strength was still not achieved, and the increasing effect of the carboxyl group equivalent by fluorine gas treatment was also insufficient. Example 6 is the same as Example 2 in that only the aliphatic polyamide (PA66) was used as a polyamide, but glass fiber concentration was higher in Example 6 than in Example 2. The strength in Example 6 was higher than in Example 2, but the carboxyl group equivalent which is an index of platability in Example 6 was lower than in Example 2. Since only the aliphatic polyamide (PA66) was used as a polyamide in Example 7, the platability was high. The slider tab pull off strength was also high. However, since the glass fiber concentration was low, the top stop holding strength in a high-temperature environment (40° C.) was an insufficient value of 67 N.

TABLE 1

| Polyamide component | Example 1 | Example 2 | Example 3 | Example 4 (Comparative) | Example 5 (Comparative) | Example 6 | Example 7 (Comparative) |
|---|---|---|---|---|---|---|---|
| Polyamide component ratio (mass ratio) 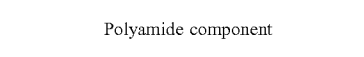 PA6T | 11.8% | — | — | 25.0% | 62.5% | — | — |

TABLE 1-continued

| Polyamide component | | Example 1 | Example 2 | Example 3 | Example 4 (Comparative) | Example 5 (Comparative) | Example 6 | Example 7 (Comparative) |
|---|---|---|---|---|---|---|---|---|
| PA6I 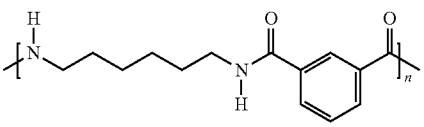 | | 29.4% | — | 16.7% | 75.0% | 25.0% | — | — |
| PA66 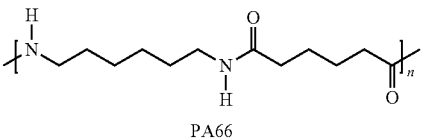 | | 58.8% | 100.0% | 83.3% | — | 12.5% | 100.0% | 100.0% |
| Molecular weight Mw | | 42000 | 61600 | 39700 | 39500 | 39000 | 61600 | 61600 |
| MFR (320° C. 2.16 kg) | g/10 min | 24 | 11 | 110 | Unmeasurable | Unmeasurable | 5 | 23 |
| GF concentration | wt % | 60 | 60 | 50 | 50 | 50 | 70 | 45 |
| Slider evaluation (5VINA) | | | | | | | | |
| Slider tab pull off strength | N | 143 | 154 | 148 | 127 | 134 | 159 | 159 |
| Top stop holding strength (normal temperature) | N | 112 | 110 | 102 | 98 | 100 | 120 | 90 |
| Top stop holding strength (high temperature) | N | 74 | 77 | 72 | 70 | 73 | 80 | 67 |
| Platability evaluation | | | | | | | | |
| Carboxyl group equivalent | After F-treatment | atom % | 1.03 | 1.64 | 1.05 | 1.22 | 0.94 | 1.03 | 1.23 |
| | Before F-treatment | atom % | 0.84 | 0.38 | 0.75 | 0.95 | 0.55 | 0.41 | 0.48 |
| Wash and dry durability | | OK | OK | OK | OK | OK | OK | OK |
| Remarks | | | | | *MFR was unmeasurable due to a high melting point. | *MFR iwa unmeasurable due to a high melting point. | | |

REFERENCE SIGNS LIST

10 Slide fastener
11 Long tape
12 Elements
13 Slider
14 Top stop
15 Opening device
16 Pull-tab

The invention claimed is:

1. A slide fastener comprising:
a slider made of a resin composition;
a pull-tab made of the resin composition and engaged with the slider for pulling the slider;
an element for sliding the slider; and
a top stop on the element for stopping the slider,
wherein the resin composition consists of 30 to 50% by mass of a polyamide and 50 to 70% by mass of reinforcing fibers, with the total of the polyamide and the reinforcing fibers being substantially 100% by mass, wherein the polyamide has a weight average molecular weight of 61,600 to 65,000,
wherein the resin composition has a melt flow rate of 6 to 50 g/10 min measured at 320 degrees C. and a measuring load of 2.16 kg,
wherein a proportion of an aliphatic polyamide is 80 parts by mass or more based on 100 parts by mass of the total amount of the polyamide, wherein the aliphatic polyamide comprises at least one selected from the group consisting of nylon 6, 6, nylon 6, 10, and nylon 6,12, and
wherein a surface of the slider and the pull-tab has been subjected to fluorine gas treatment to have a carboxyl group equivalent of 1.5 atom % or more, and at least a part of the surface of the slider and the pull-tab is metal plated.

2. The slide fastener according to claim 1, wherein the proportion of the aliphatic polyamide is 100 parts by mass based on 100 parts by mass of the total amount of the polyamide.

3. The slide fastener according to claim 1, wherein the aliphatic polyamide comprises at least one aliphatic polyamide obtained by co-polycondensation of an aliphatic diamine and an aliphatic dicarboxylic acid.

4. The slide fastener according to claim 1, wherein the reinforcing fibers comprise at least one selected from the group consisting of glass fibers, carbon fibers, and aramid fibers.

5. The molded component for slide fasteners according to claim 1, wherein an average fiber length of the reinforcing fibers after molding is 0.1 mm to 1.0 mm.

* * * * *

UNITED STATES PATENT AND TRADEMARK OFFICE
CERTIFICATE OF CORRECTION

PATENT NO. : 10,273,360 B2
APPLICATION NO. : 14/362622
DATED : April 30, 2019
INVENTOR(S) : Kazuya Mizumoto et al.

It is certified that error appears in the above-identified patent and that said Letters Patent is hereby corrected as shown below:

In the Specification

In Columns 13-14, Line 24 (TABLE 1-continued), delete "iwa" and insert -- was --, therefor.

Signed and Sealed this
Ninth Day of July, 2019

Andrei Iancu
*Director of the United States Patent and Trademark Office*